(No Model.) 2 Sheets—Sheet 1.
H. V. HARTZ.
Method of Preparing and Welding Pipe Sections.
No. 243,038. Patented June 14, 1881.
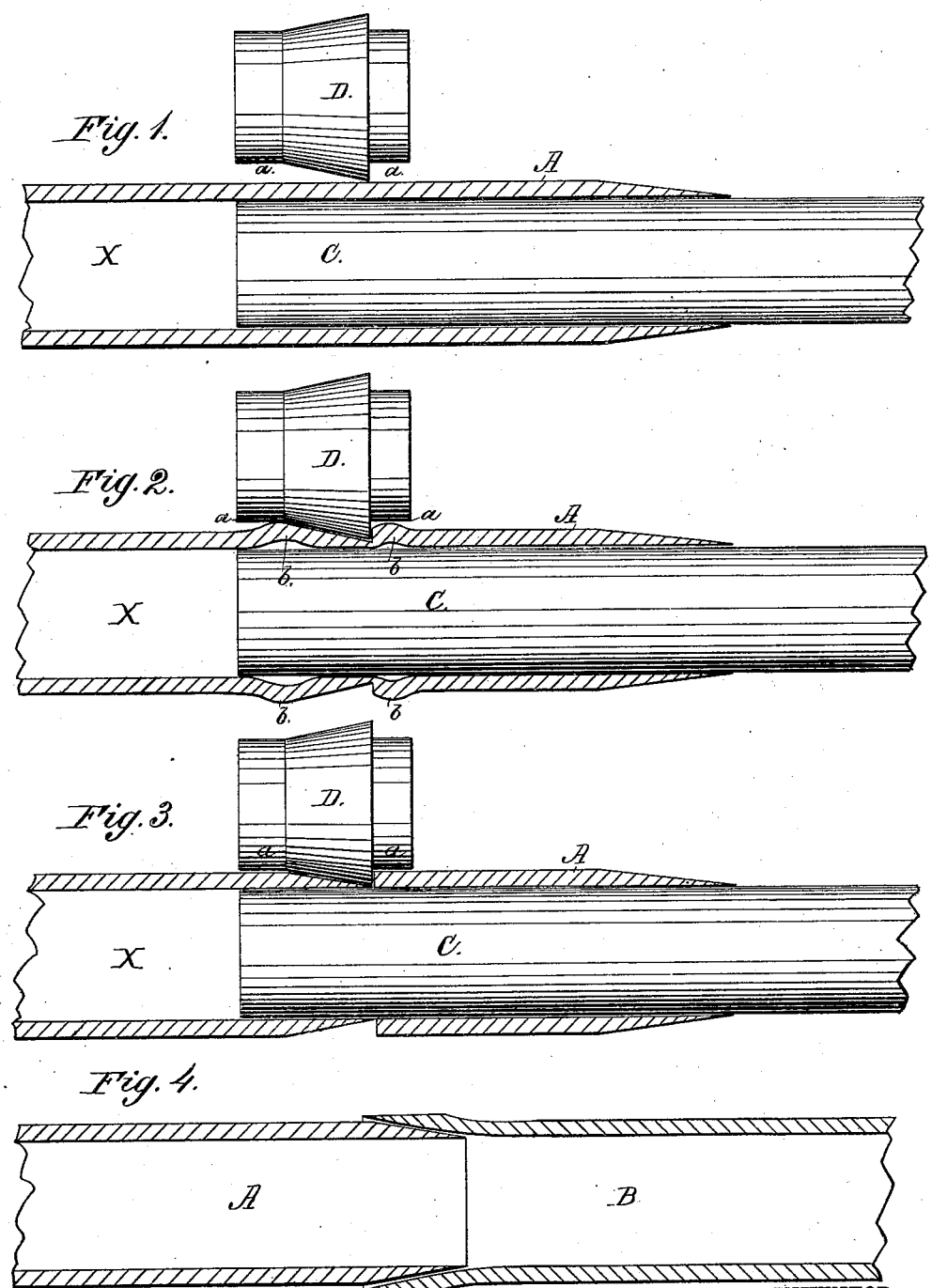

(No Model.) 2 Sheets—Sheet 2.
H. V. HARTZ.
Method of Preparing and Welding Pipe Sections.
No. 243,038. Patented June 14, 1881.
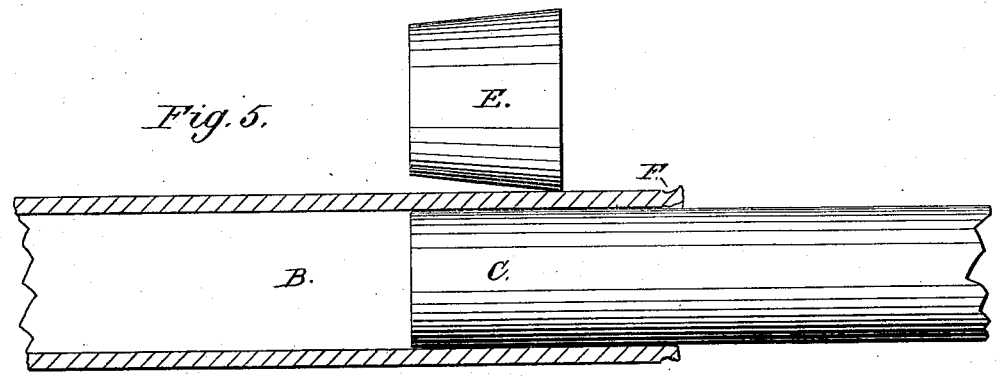
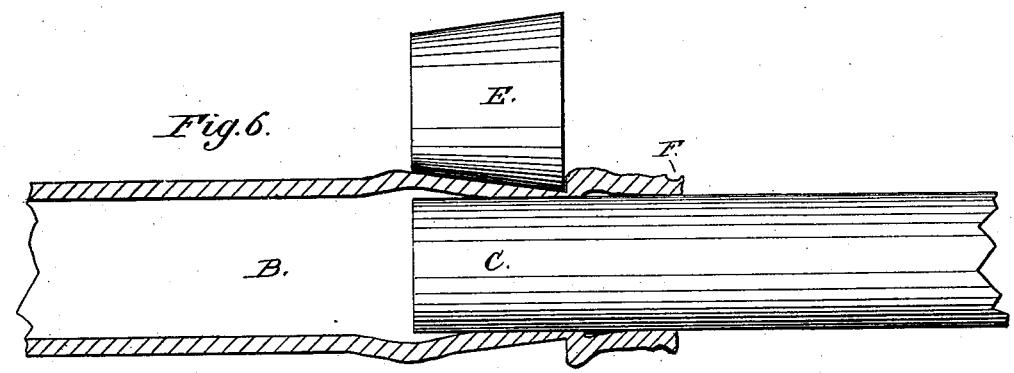
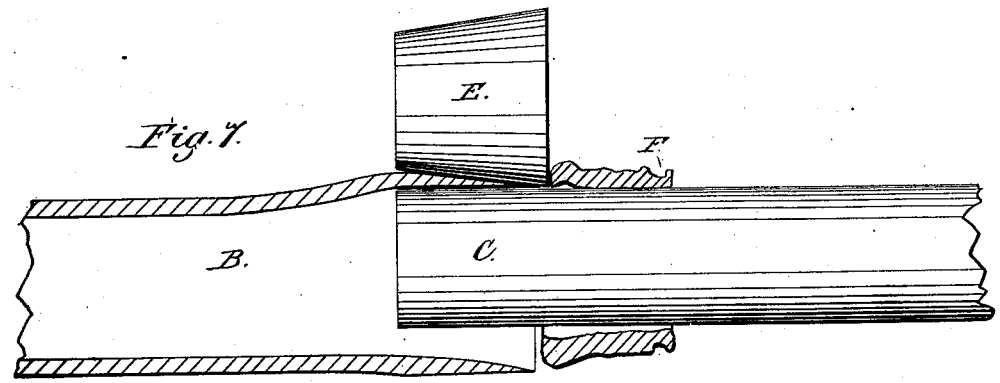

United States Patent Office.

HENRY V. HARTZ, OF CLEVELAND, OHIO, ASSIGNOR TO HIMSELF AND ORAM FIX, OF SAME PLACE.

METHOD OF PREPARING AND WELDING PIPE-SECTIONS.

SPECIFICATION forming part of Letters Patent No. 243,038, dated June 14, 1881.

Application filed August 26, 1880. (No model.)

*To all whom it may concern:*

Be it known that I, HENRY V. HARTZ, of Cleveland, in the county of Cuyahoga and State of Ohio, have invented a new and Improved Method of Preparing and Welding Sections of Metal Pipes; and I do hereby declare that the following is a full, clear, and exact description of the same.

My invention relates to a novel method of preparing and welding together sections of metal pipe or tubing. It is designed more particularly for welding short sections onto old boiler-tubes, so as to give them sufficient length to permit them to be again reset in the same tube-sheets, the old tubes being too short to be reset without lengthening.

The ordinary method of resetting old tubes is to mill down or hammer one end of a section of tube to an entering bevel or male end, and expand by hammering or milling the end of the other section to a tapering or female end adapted to receive the male end, after which they are joined and welded together by hand. The difficulty attending this plan is, that much labor is required to prepare the ends, and the time required to turn and weld the sections on all sides is such that the heat decreases at the end of the operation, so as to fail to secure the most perfect uniting of the parts, and both skilled workmen and hand labor are required for the work.

My invention consists in a method of working which permits these operations to be successfully accomplished by a machine in much less time, with much less labor, and with a much more perfect result. The method consists in simultaneously cutting off and scarfing or beveling the male or entering end by rolling a bevel channel around the tube on a mandrel, and continuing this rolling action until the section is severed, and at the same time holding down the metal on each side of the bevel channel to prevent enlargement of the cut ends; then in a second operation cutting and expanding the female end simultaneously by rolling a bevel channel around the tube on a mandrel, and continuing this rolling action until the section is severed, and at the same time allowing the metal on each side of the bevel cut to spread or move freely, to permit the cut ends to be expanded, by the mashing action of the roll, to a diameter large enough to receive the male end, as hereinafter more fully described.

In the drawings, Figure 1 represents the commencement of the operation of cutting off a splice-section from new tubing and scarfing or beveling the end of the next piece. Fig. 2 shows the operation about done. Fig. 3 shows it completed, in which the splice-section A is cut off ready to be entered into the female end of the boiler-tube, as in Fig. 4. Fig. 4 shows the male and female ends fitted together ready to be finally rolled and welded. Fig. 5 represents the beginning of the operation of cutting off the fag-end of the old boiler-tube, and expanding its end to form the female section. Fig. 6 represents the operation about half done; and Fig. 7 represents the operation complete, in which the fag-end is cut off, and the end B of the old tube enlarged to form the female section shown in Fig. 4.

The only part of a machine which I have thought it necessary to show is a fixed mandrel, C, and the rolls D and E for the two consecutive operations, it being understood that the rolls are to be carried around the mandrel with a rotary action, and projected with greater or less force against the pipe on the mandrel. For this purpose the form of mechanism shown in my application for a patent filed December 22, 1879, may be used, or any other mechanism which will give the requisite movement to the rolls and means for regulating them. In practice, also, I find it desirable to employ another roll of the same construction as the one in use, arranged diametrically to the one shown in the drawings, so as to resist strain on the mandrel.

Referring to Fig. 1, a section of pipe, X, is taken, from which the splice-section A is to be cut, and placed over the mandrel C. As shown, the end of this section is already beveled by a previous operation similar to the one which I am now about to describe, which latter operation cuts off splice-section A and gives a bevel to the stock end of pipe X. Now, the roll D, as will be seen, has a conoidal or beveled face in the middle, and straight shoulders *a a* on each side parallel with its axis. On forcing this roll down upon the heated tube it commences to form a beveled channel around the tube, as shown in Fig. 2, and by continuing the revolution of the roll the tube-section is finally cut entirely through, the shoulders *a a* of the roll meantime rolling down any extra thickness of tube-wall produced by the beveling-roll. This mode of holding the metal down on each side of the bevel channel while it is being cut, it will be seen, preserves the square end of section A of the same diameter as the body portion, so that it will pass through and fit in the holes of the tube-sheet, and also prevents the spreading of the male end, making the cut an outside bevel cut, instead of mashing the tube thin at its ends and spreading it to a larger diameter, as would take place if the metal were not held down on each side of the cut, as will be hereinafter explained. The action of the roll D then is to cut off a splice-section, A, and scarf or bevel the end of the stock for the next cut, preserving the bevel all on the outside, so that it shall form the smaller male or entering end of the two sections to be joined.

For cutting and expanding the female end B, Fig. 4, a roll, E, is substituted for roll D, which does not have the shoulders *a a*, and as a result the metal is not held down on each side of the bevel cut, and the end of the tube is expanded, as at B in Fig. 4. Thus (referring to Fig. 5) the old boiler-tube B, whose end has been mutilated by removal from the tube-sheet, is placed over the mandrel, and the roll E is made to traverse around the same. When about half done the tube presents the appearance shown in Fig. 6, and when completed it appears as in Fig. 7, in which the loose fag-end F is entirely severed, and the end of the tube B is beveled and at the same time expanded, the bevel being nearly obliterated by the free lateral crowding of the metal, which increases the diameter of the tube and gives it the flared appearance shown at B in Fig. 4.

In conducting these two operations it is necessary to success that the cutting and beveling of the male end be conducted much slower than the cutting and expanding of the female end. Thus, for instance, in cutting the male section, from six to ten revolutions of the roll are required, while in cutting and expanding the female end a heavy pressure on the roll and but two or three revolutions of the same are required. After the male and female ends are thus formed the female end is heated, fitted over the male end, and shrunk on, and after this the joint is heated, placed on the mandrel, and a plain roll having a periphery parallel to its axis is made to cement the joint and weld the same into a homogeneous straight wall.

I have so far described my invention with respect to welding old boiler-tubes. I would have it understood, however, that I do not confine my invention to this work, but may use it for welding together any kind of pipe, tubes, &c.

In defining more clearly the relation of this application to my prior application filed December 22, 1879, I would state that I desire to claim herein only the method described.

Having thus described my invention, what I claim as new is—

1. The method of simultaneously cutting off a spliced section of a pipe or tube and preparing a beveled male end on the other section, which consists in rolling a bevel channel around the pipe or tube and continuing this operation until the pipe is cut through, and at the same time holding down the metal on each side of this beveled cut, as described.

2. The method of simultaneously cutting off a fag-end and expanding the female end of a pipe or tube joint, which consists in rolling a bevel channel around the pipe or tube on a mandrel and continuing this operation until the tube is cut through, and at the same time allowing the metal free movement on each side of the bevel cut as described.

3. The method of preparing and welding pipe-sections, which consists in rolling a bevel channel around the pipe, continuing this operation until the pipe is cut through and holding the metal down, as described, to form the male end, and then rolling a bevel channel around the other section of pipe, and continuing this operation until the pipe is cut through, and at the same time allowing free movement to the metal to spread at the edge of the channel to form the female end, and then fitting these two sections together and welding them by rolling, substantially as described.

The above specification of my invention signed by me this 21st day of August, 1880.

HENRY V. HARTZ.

Witnesses:
CHAS. A. PETTIT,
EDWD. W. BYRN.